United States Patent
Vu et al.

(10) Patent No.: US 9,058,042 B2
(45) Date of Patent: Jun. 16, 2015

(54) PRESSURE RELIEF VALVE ASSEMBLY

(71) Applicant: Eaton Corporation, Cleveland, OH (US)

(72) Inventors: Anh Vu, Irvine, CA (US); Vismay Walle, Pune (IN); Harshad Pawale, Pune (IN); Sandip Gaikwad, Pune (IN); Sahebrao Tekale, Pune (IN)

(73) Assignee: Eaton Corporation, Cleveland, OH (US)

( * ) Notice: Subject to any disclaimer, the term of this patent is extended or adjusted under 35 U.S.C. 154(b) by 154 days.

(21) Appl. No.: 13/833,283

(22) Filed: Mar. 15, 2013

(65) Prior Publication Data

US 2014/0261782 A1   Sep. 18, 2014

(51) Int. Cl.
*F16K 17/196* (2006.01)
*G05D 16/10* (2006.01)
*G05D 16/06* (2006.01)
*F16K 31/56* (2006.01)

(52) U.S. Cl.
CPC .............. *G05D 16/10* (2013.01); *G05D 16/063* (2013.01); *F16K 17/196* (2013.01); *F16K 31/56* (2013.01)

(58) Field of Classification Search
CPC ................................ F16K 17/10; F16K 17/042
USPC ............... 137/1, 467, 489, 493.4, 493.6, 583, 137/624.27
See application file for complete search history.

(56) References Cited

U.S. PATENT DOCUMENTS

| 2,406,120 | A |   | 8/1946 | Wirth |           |
|-----------|---|---|--------|-------|-----------|
| 2,995,148 | A | * | 8/1961 | Novak et al. | 137/493.4 |
| 3,307,575 | A | * | 3/1967 | Dickinson et al. | 137/491 |
| 3,592,224 | A | * | 7/1971 | Bois | 137/462 |
| 3,826,277 | A |   | 7/1974 | Bois |           |
| 4,312,375 | A | * | 1/1982 | Leinemann | 137/489 |
| 7,086,388 | B2| * | 8/2006 | Roth et al. | 123/510 |

FOREIGN PATENT DOCUMENTS

GB        816515       7/1959

OTHER PUBLICATIONS

International Search Report with Written Opinion, Int'l filing date: Mar. 14, 2014, PCT/US14/27195, mailing date Jul. 3, 2014.

* cited by examiner

*Primary Examiner* — Kevin Murphy
*Assistant Examiner* — R. K. Arundale
(74) *Attorney, Agent, or Firm* — Benesch, Friedlander, Coplan & Aronoff, LLP

(57) ABSTRACT

A pressure relief valve assembly includes a housing, a diaphragm assembly separating the housing into a sensing pressure section and a tank pressure section, the sensing pressure section configured to sense both atmospheric pressure and the pressure in the tank pressure section and the tank pressure section is configured to only sense the pressure in the tank pressure section, an orifice disposed between the sensing pressure section and the tank pressure section allowing fluid to flow in through the orifice when the pressure in the sensing pressure section is less than the pressure in the tank pressure section fluid to flow out through the orifice when the pressure in the sensing pressure section is greater than the pressure in the tank pressure section.

17 Claims, 9 Drawing Sheets

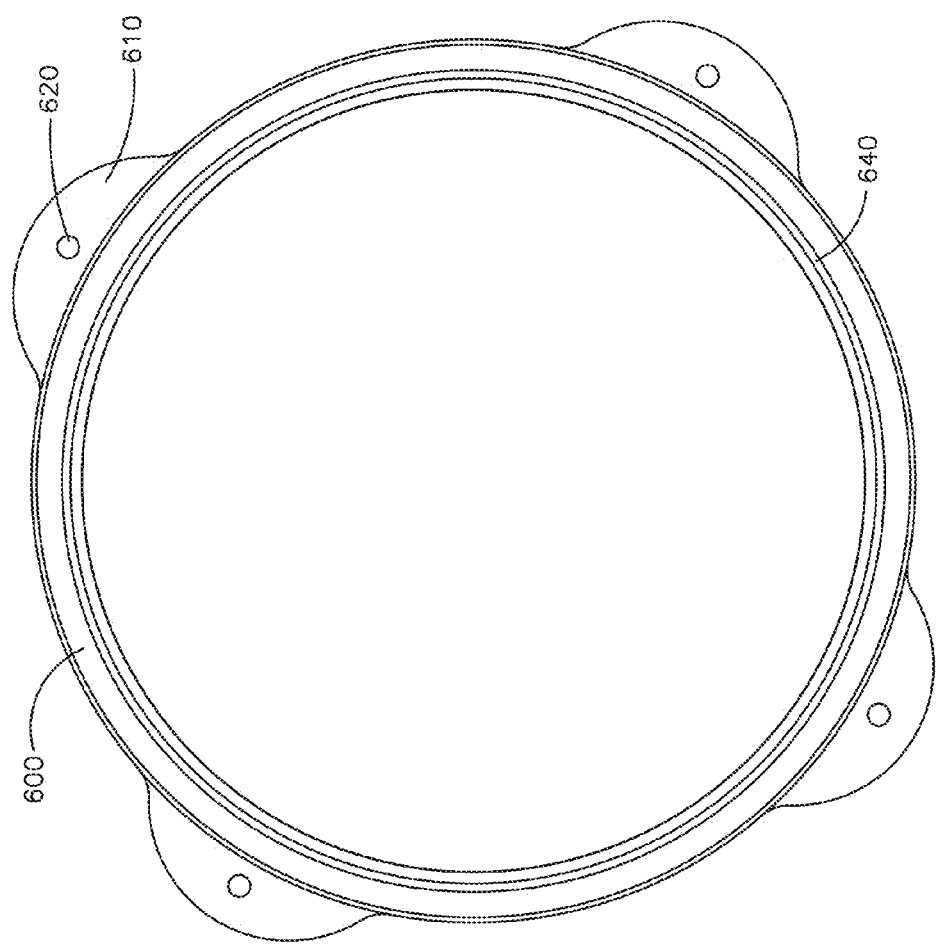

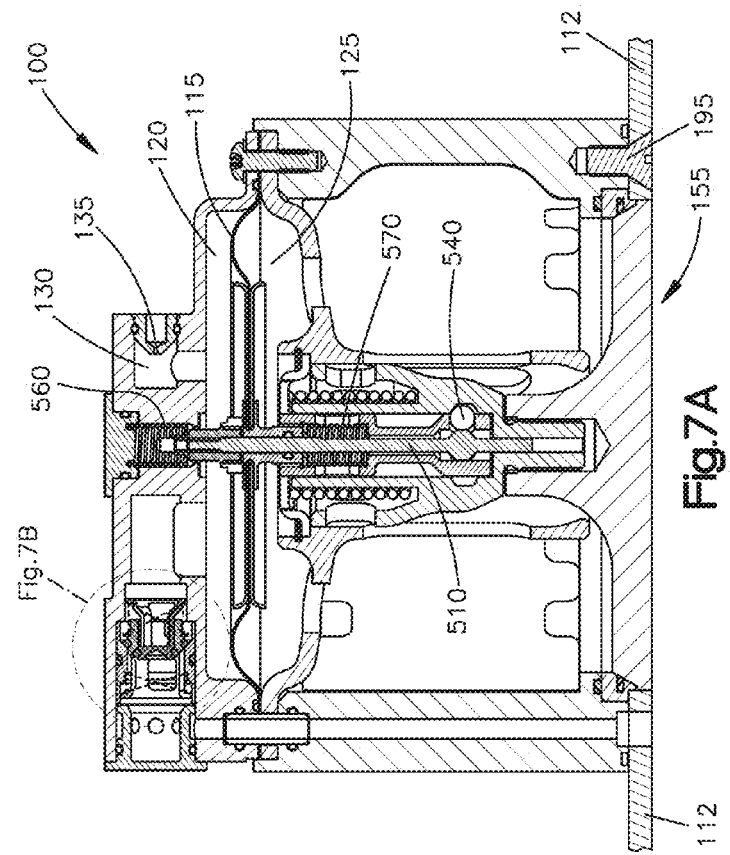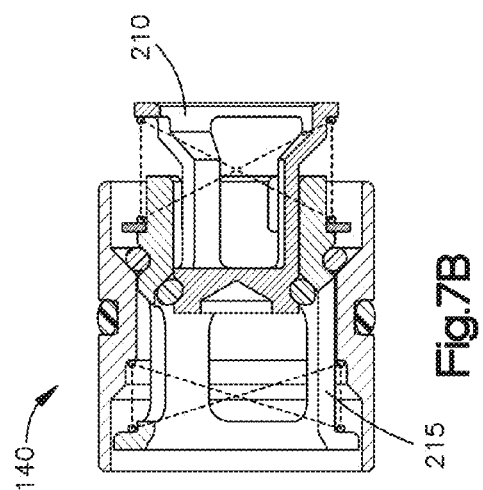

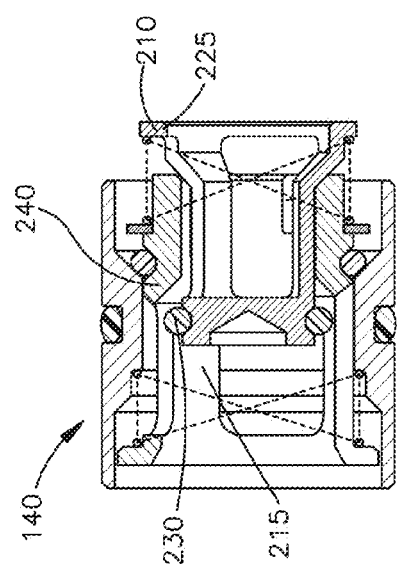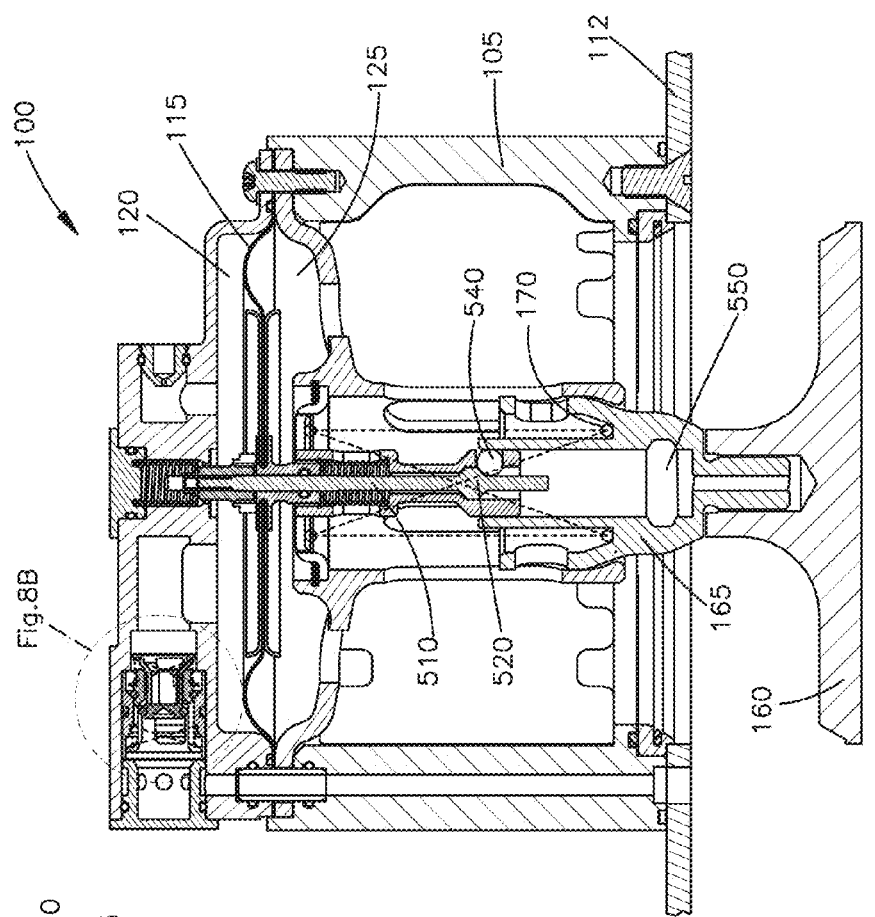

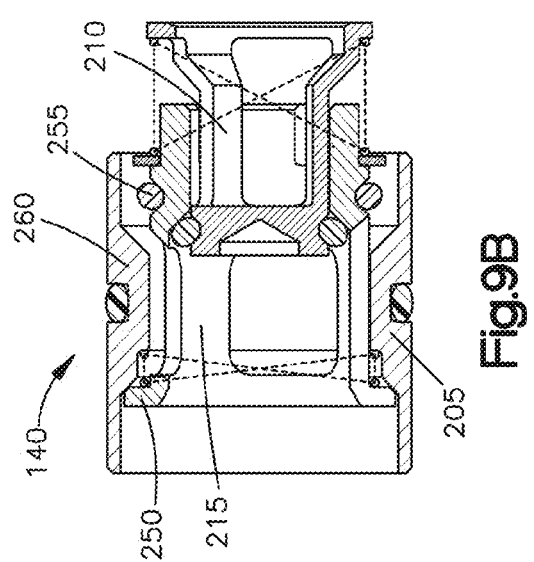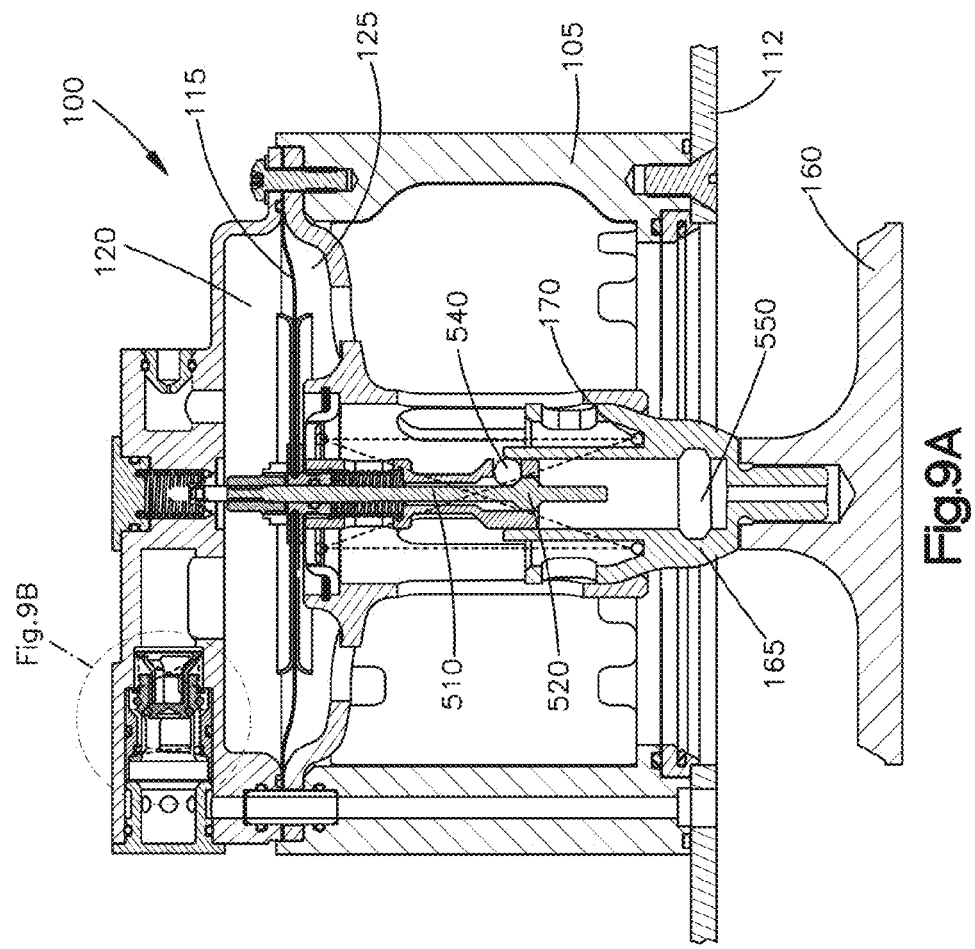

PRESSURE RELIEF VALVE ASSEMBLY

FIELD OF INVENTION

The present disclosure relates to a pressure relief valve assembly for a tank. More particularly, the present disclosure relates to a pressure relief valve assembly configured to control the pressure in a tank to prevent over-pressurization and under-pressurization relative to the ambient pressure outside the tank.

BACKGROUND

Pressure relief valves are used in fuel tanks and other tanks of liquid. In one known example, a pressure relief valve is used in a surge tank of an aircraft to balance internal tank pressure with respect to atmospheric pressure. Tank pressure may become too high or too low due to a blockage, or during ascent, descent, or refueling of the aircraft.

SUMMARY OF THE INVENTION

A pressure relief valve assembly includes a housing; a diaphragm assembly separating the housing into a sensing pressure section and a tank pressure section, wherein the sensing pressure section is configured to sense both atmospheric pressure and tank pressure and the tank pressure section is configured to only sense tank pressure and an orifice disposed between the sensing pressure section and the tank pressure section, allowing fluid to flow in through the orifice when the pressure in the sensing pressure section is less than the pressure in the tank pressure section, and to allow fluid to flow out through the orifice when the pressure in the sensing pressure section is greater than the pressure in the tank pressure section.

The pressure relief valve assembly further includes a pilot valve assembly disposed between the sensing pressure section and atmosphere, the pilot valve assembly being configured to open when a difference in pressure between the sensing pressure section and atmospheric pressure exceeds a predetermined first amount and a main poppet assembly disposed in the tank pressure section, wherein the main poppet assembly is configured to open when a difference in pressure between the sensing pressure section and the tank pressure section meets a predetermined second amount.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 6 is a bottom view of one embodiment of a seat for a seal assembly of a pressure relief valve assembly;

FIGS. 7A and 7B are a cross section of the pressure relief valve assembly, and a detailed cross section of the pilot relief valve, in an installed condition;

FIGS. 8A and 8B are a cross section of the pressure relief valve assembly, and a detailed cross section of the pilot relief valve, in a positive tank pressure relief condition; and FIGS. 9A and 9B are a cross section of the pressure relief valve assembly, and a detailed cross section of the pilot relief valve, in a negative tank pressure relief condition.

DETAILED DESCRIPTION

Figure 1:
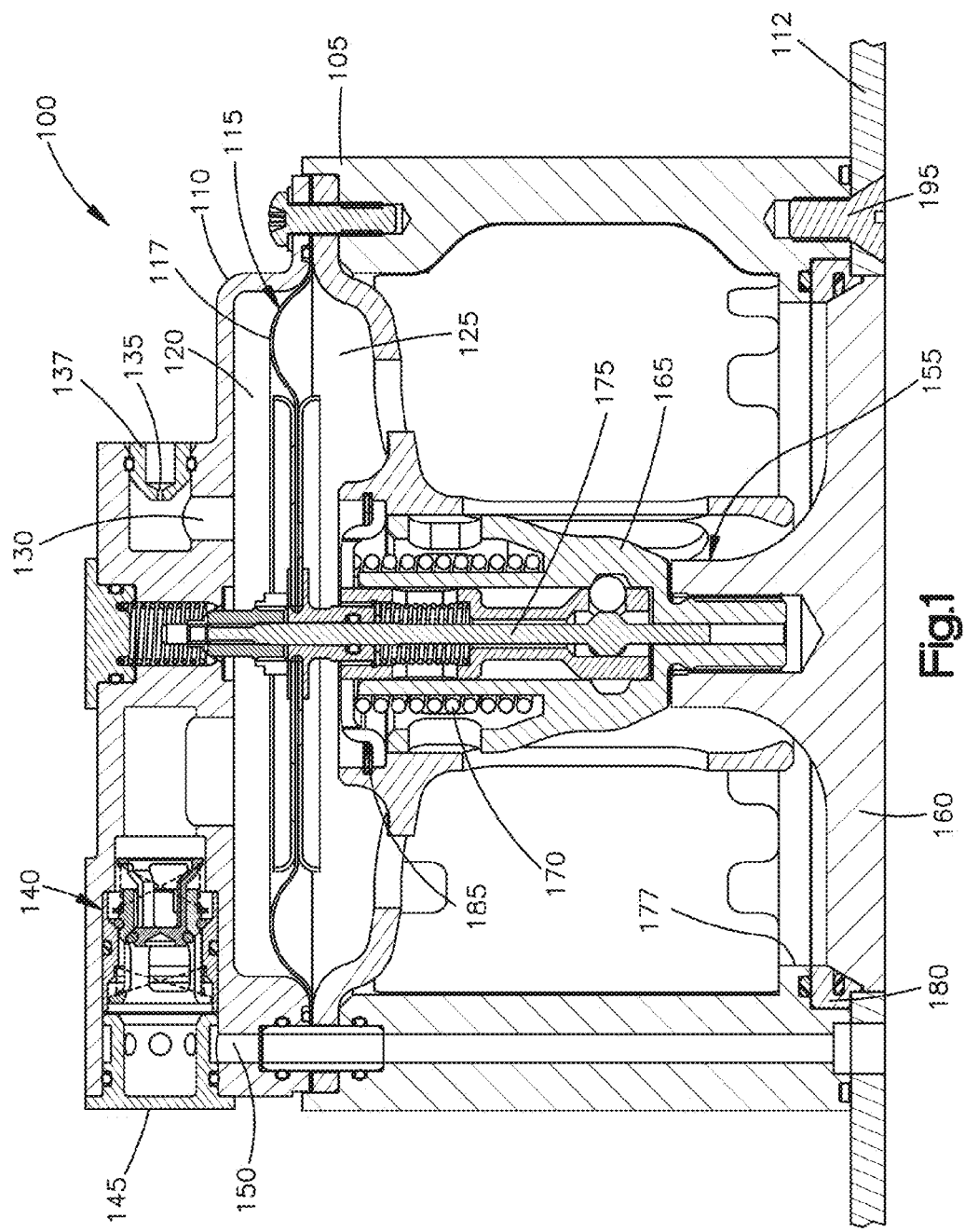
FIG. 1 is a cross section of one embodiment of a pressure relief valve assembly.

FIG. 1 illustrates a cross section of one embodiment of a pressure relief valve assembly 100. The pressure relief valve assembly 100 may be employed in a tank, such as a fuel tank. More particularly, the pressure relief valve assembly 100 may be employed in an aircraft surge tank.

The pressure relief valve assembly 100 includes a main or primary housing 105 and a diaphragm housing 110. The primary housing 105 is generally disposed in a tank 112, such as a fuel tank. A diaphragm assembly 115 separates two sections of the pressure relief valve assembly 100, namely a sensing pressure section 120 and a tank pressure section 125.

The diaphragm assembly 115 utilizes a flexible diaphragm 117 that is configured to move in accordance with a pressure differential between the sensing pressure section 120 and the tank pressure section 125. For example, when the pressure in the sensing pressure section 120 is greater than the pressure in the tank pressure section 125, the diaphragm assembly 115 will move downwards, towards the tank pressure section 125. Likewise, when the pressure in the tank pressure section 125 is greater than the pressure in the sensing pressure section 120, the diaphragm assembly 115 will move upwards, towards the sensing pressure section 120. The diaphragm 117 may be constructed of materials such as, without limitation, Nitrile, Fluorosilicone, or Hydrogenated Nitrile Butadiene Rubber (HNBR).

In the illustrated embodiment, the pressure relief valve assembly 100 further includes an orifice 135 in a pathway 130 that connects the sensing pressure section 120 to the tank pressure section 125. In one embodiment, orifice 135 is defined in an orifice plug 137 that is received within a corresponding receptacle in the diaphragm housing 110. The orifice 135 allows fluid in the tank 112 to flow in through the pathway 130 to the sensing pressure section 120 when the pressure in the sensing pressure section 120 is less than the pressure in the tank pressure section 125, and further allows fluid to flow out through the pathway 130 when the pressure in the sensing pressure section 120 is greater than the pressure in the tank pressure section 125. In this manner, the orifice 135 either equalizes the pressure differential across the diaphragm assembly 115 or creates a pressure differential across the diaphragm assembly 115.

A pilot valve assembly 140 is disposed between the sensing pressure section 120 and an atmospheric air pressure sensing port 150. A cap 145 retains the pilot valve assembly 140 within the diaphragm housing 110 and is configured to provide the pilot valve assembly 140 in fluid communication with atmospheric air pressure sensing port 150. The atmospheric air pressure sensing port 150 senses the atmospheric pressure and provides the flow path through the cap 145 and then the pressure relief valve assembly 100 (inward or outward) depending on the operation mode (negative or positive pressure relief) of the pilot valve assembly 140. In this configuration, the pilot valve assembly 140 has one side sensing atmospheric pressure and the other side sensing pressure in the sensing pressure section 120 of the primary housing 105. The pilot valve assembly 140 is configured to open when the difference between the pressure in the sensing pressure section 120 and atmospheric air pressure sensing port 150 is greater than a predetermined threshold. In one example, the pilot valve assembly 140 opens when the atmospheric air pressure is greater than the pressure in the sensing pressure section by the predetermined threshold. This may be referred to as a negative tank pressure relief condition. In another example, the pilot valve assembly 140 opens when the pressure in the sensing pressure section is greater than the atmospheric air pressure by the predetermined threshold. This may be referred to as a positive tank pressure relief condition.

The pressure relief valve assembly 100 further includes a main poppet assembly 155 that includes a main poppet 160, a poppet guide 165, a deployment spring 170, and a detent assembly 175. The main poppet 160 is disposed in a main opening 177 of the primary housing 105, and is seated in a seal assembly 180 when in a closed position.

In the illustrated embodiment, the poppet guide 165 is an intermediate member disposed between the main poppet 160 and the deployment spring 170. In an alternative embodiment (not shown), the main poppet 160 and the poppet guide 165 may be a single integral unit, with the deployment spring 170 acting directly on the integral unit.

The deployment spring 170 loads the main poppet assembly 155 away from the diaphragm housing 110. That is, the deployment spring 170 loads the main poppet assembly 155 towards an open position, such as the positions illustrated in FIGS. 8 and 9. In alternative embodiments (not shown), other methods may be employed to deploy the main poppet, such as magnets, electromagnets, and other known force generating devices.

To close the main poppet assembly 155, force is applied in the opposite direction of the opening force produced by the deployment spring 170. A stop 185 prevents inward movement of the main poppet assembly 155 beyond a predetermined distance when the main poppet 160 is moved to the closed position. After the main poppet assembly 155 is closed, the detent assembly 175 retains the main poppet assembly 155 in the closed position.

Figure 2:
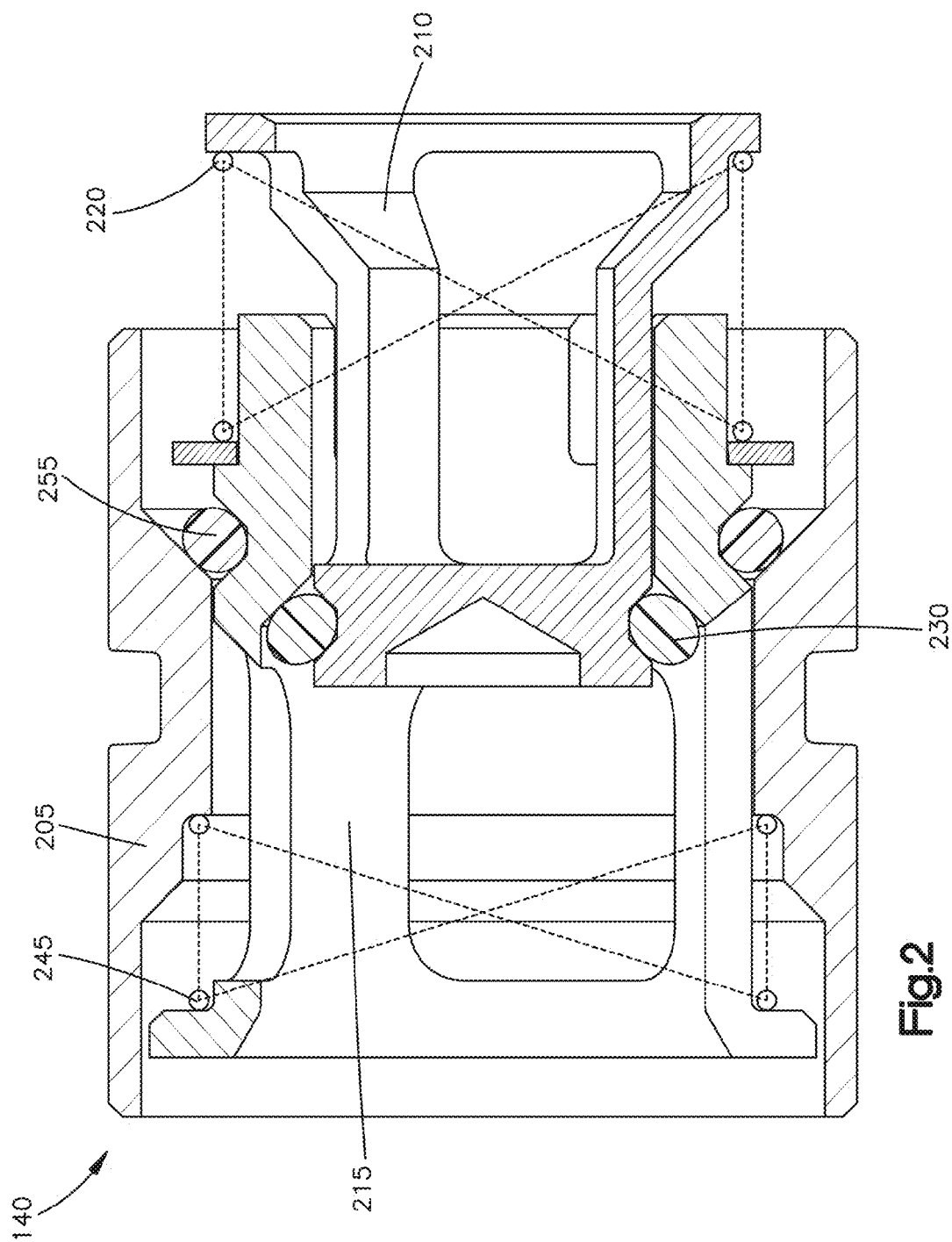
FIG. 2 is a detailed view of a cross section of one embodiment of a pilot relief valve for a pressure relief valve assembly.

FIG. 2 is a detailed cross sectional view of one embodiment of the pilot valve assembly 140. In the illustrated embodiment, the pilot valve assembly 140 includes a pilot valve housing 205 that houses two poppets, a positive tank pressure relief poppet 210 and a negative tank pressure relief poppet 215. The positive tank pressure relief poppet 210 is disposed in the negative tank pressure relief poppet 215. A spring 220 loads the positive tank pressure poppet 210 and seal 230 in the closed position. Another spring 245 loads the negative tank pressure relief poppet 215 and seal 255 in the closed position. The pilot valve assembly 140 is essentially an in-line bi-directional relief valve.

It should be understood that while the embodiments have been described using springs 220 and 245, any force generating device may be employed. Additionally, in the illustrated embodiment, the seals 230 and 255 are O-rings. However, it should be understood that any type of seal may be employed.

Figure 3:
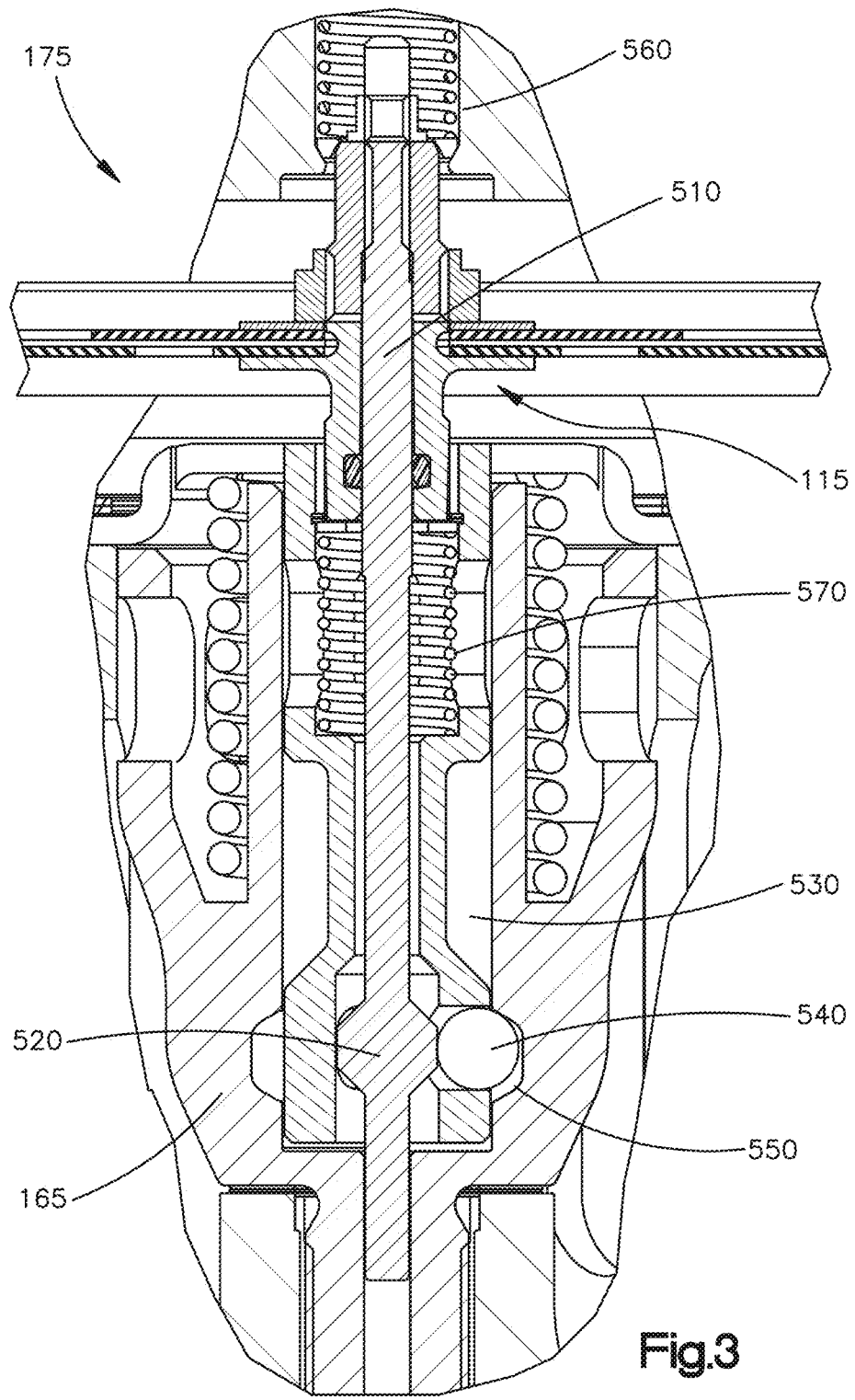
FIG. 3 is a detailed view of a cross section of one embodiment of a detent assembly for a pressure relief valve assembly.

FIG. 3 is a detailed cross sectional view of the detent assembly 175. In the illustrated embodiment, the detent assembly 175 includes a detent rod 510 having one end connected to the diaphragm assembly 115. The detent rod 510 has no other fixed connections, and therefore moves with the diaphragm assembly 115. In the illustrated embodiment, the detent rod 510 is threaded to the diaphragm assembly 115. In alternative embodiments (not shown), the detent rod may be connected to the diaphragm assembly 115 via adhesive, welding, swaging, a press fit, or through other methods of connection. It should be understood that the connection may be a direct or indirect connection. It should be further understood that other movable members or detent members may be employed in lieu of a rod.

With continued reference to FIG. 3, the detent rod 510 further includes a second end having an enlarged portion 520, and is surrounded by a retainer housing 530. In the illustrated embodiment, the enlarged portion 520 has a generally cylindrical shape with angles and ramps at either end. However, it should be understood that the enlarged portion may have any geometric shape.

The detent assembly 175 further includes a detent ball 540. In the illustrated embodiment, the detent rod 510 is in a position, such that the enlarged portion 520 contacts the detent ball 540 locking the main poppet assembly 155 in the closed position. When the detent ball 540 is in the closed position, as shown, it is seated in an aperture of the retainer housing 530, and also partially seated in an annular groove 550 of the poppet guide 165. Therefore, the detent ball 540 prevents movement of the poppet guide 165 relative to the retainer housing 530, and retains the main poppet assembly 155 in the closed position. In one embodiment, the detent assembly 175 includes a single detent ball. In an alternative embodiment, the detent assembly 175 includes multiple detent balls. It should be understood, however, that other locking members or retaining members, such as pins, may be employed instead of a detent ball.

The detent assembly 175 further includes an upper balancing spring 560 disposed about the detent rod 510 in the sensing pressure section 120 of the primary housing 105, and a lower balancing spring 570 in the tank pressure section 125 of the primary housing 105. The upper and lower balancing springs 560, 570 load the detent rod 510 in opposite directions, such that when the loads are balanced the enlarged portion 520 of the detent rod 510 is centered on the detent ball 540. In alternative embodiments, other dampeners, such as magnets, may be used.

Figure 4:
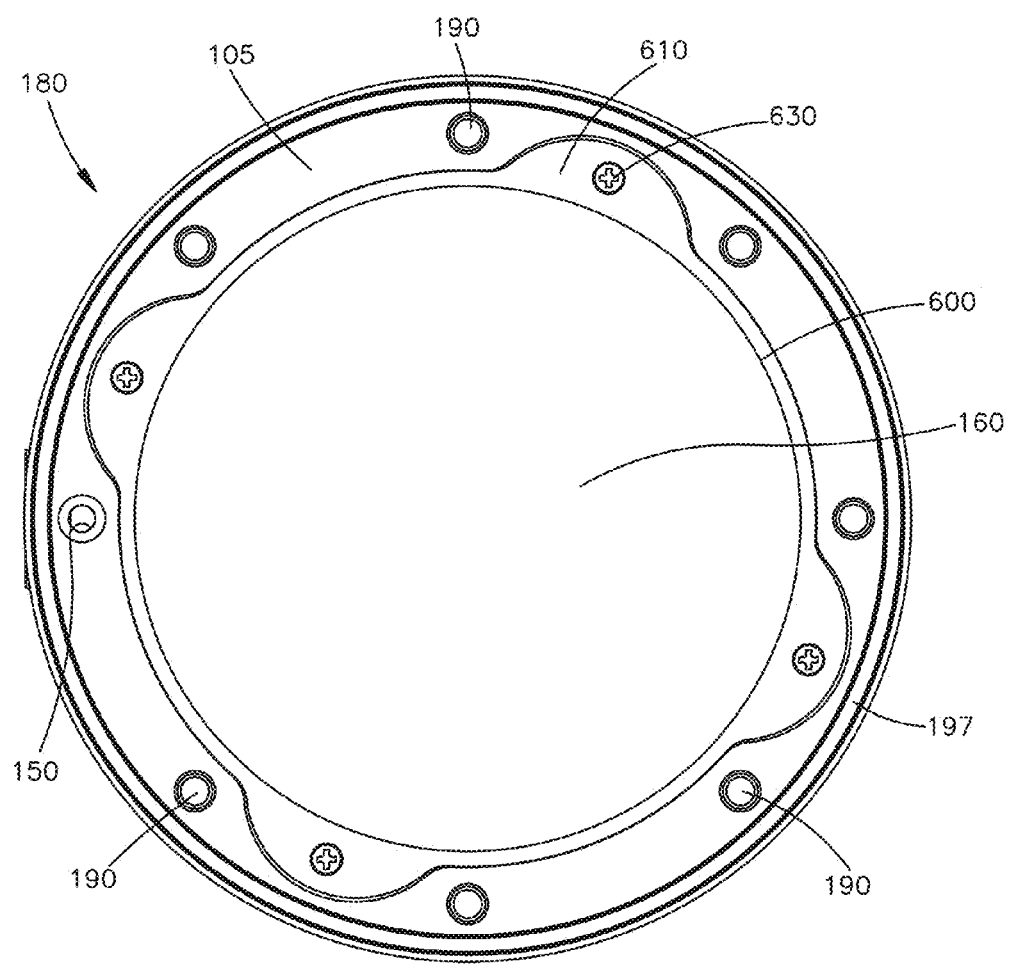
FIG. 4 is a bottom view of one embodiment of a pressure relief valve assembly showing a seal assembly.
Figure 5:
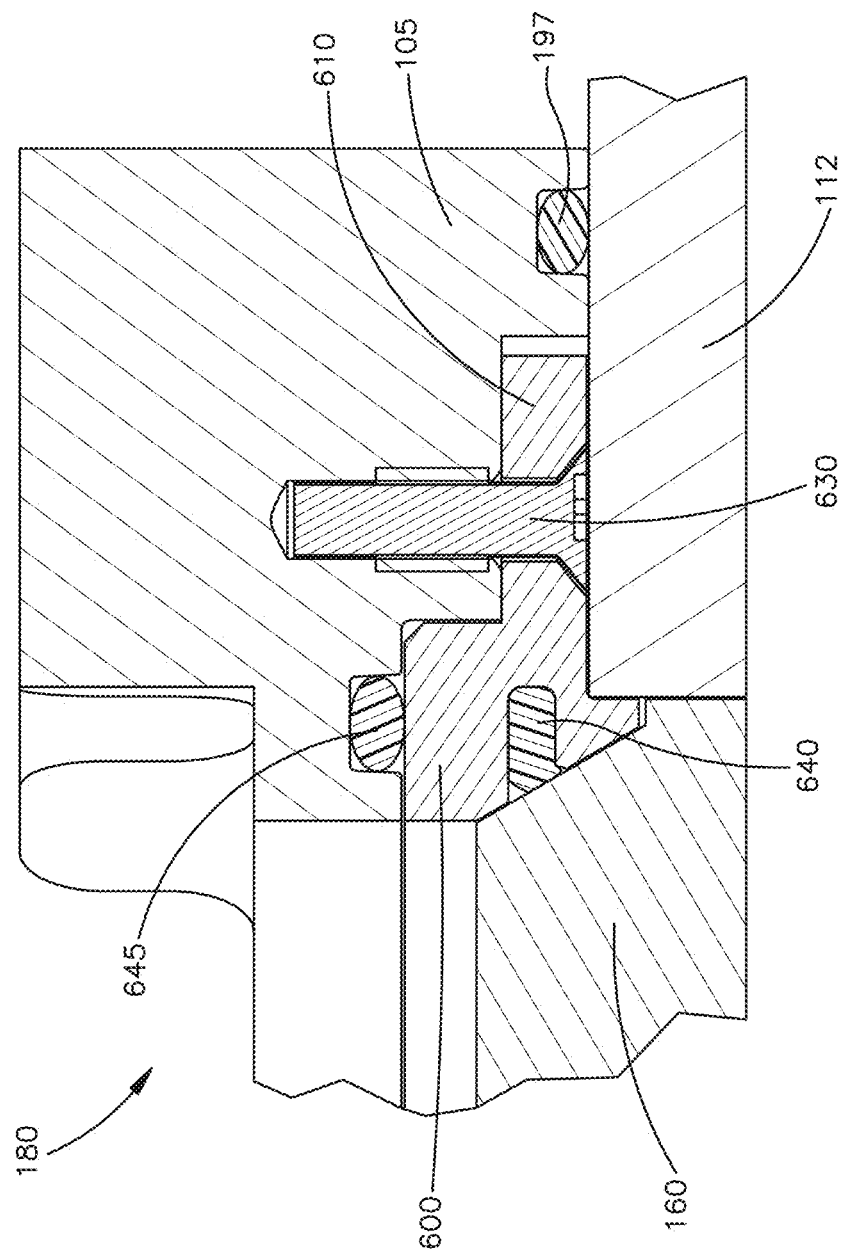
FIG. 5 is a detailed view of a cross section of one embodiment of seal assembly for a pressure relief valve assembly.

The seal assembly 180 will be described with reference to FIGS. 4-6. The seal assembly 180 includes the bottom of the primary housing 105 and a seat assembly 600. In the embodiment in FIG. 4, the main poppet 160 is shown in the closed position in sealing contact with the seat assembly 600. The atmospheric air pressure sensing port 150 is shown extending through the bottom of the primary housing 105. The primary housing 105 also includes a number of apertures 190, each configured to receive a fastener 195 (as shown in FIG. 1) for securing the pressure relief valve assembly 100 to the tank 112. A tank seal 197, such as an elastomeric O-ring or gasket, may also be provided to create a seal between the primary housing 105 and the tank 112.

A bottom view of the seat assembly 600 is shown in FIG. 6. The seat assembly 600 is an annular ring having a plurality of ears 610 disposed thereon. In the illustrated embodiment, the seat assembly 600 includes four ears 610. However, it should be understood that any number of ears may be employed. Each of the ears 610 includes an aperture 620 for receiving a fastener 630 (as shown in FIG. 5). In the illustrated embodiment, screws are used to fasten the seat assembly 600 to the bottom surface of the primary housing 105. In an alternative embodiment (not shown), other fasteners, such as bolts, pins, or rivets may be employed. In another alternative embodiment (not shown), the seat assembly may be affixed to the bottom of the housing with adhesive.

In one known embodiment, the seat assembly 600 is constructed of fluorosilicone. In an alternative embodiment, the seat assembly 600 is constructed of polyether ether ketone (PEEK). In other alternative embodiments, the seat assembly may be constructed of other polymeric material. In all embodiments, the main poppet 160 may be coated with polytetrafluoroethylene (PTFE) or other polymeric material to avoid sticking and to reduce friction. It should also be understood that alternative sealing assemblies may be employed. For example, one or more O-rings or gaskets 640, 645 may be employed to provide a seal between the main poppet 160 and the primary housing 105, respectively.

FIGS. 7A and 7B are a cross section of the pressure relief valve assembly 100, and a detailed cross section of the pilot valve assembly 140, in an installed condition. In the installed condition, the main poppet assembly 155 is closed, the detent assembly 175 is in the pressure relief valve assembly 100 closed position (i.e., the position shown in FIG. 3) and the positive tank pressure poppet 210 and the negative tank pressure poppet 215 of the pilot valve assembly 140 are both in their closed positions. Accordingly, fluid does not pass through the pilot valve assembly 140, as shown in Detail 7B.

While the pressure relief valve assembly 100 is in the installed condition, the pathway 130 allows fluid to flow in through the orifice 135 when the pressure in the sensing pressure section 120 is less than the pressure in the tank pressure section 125, in the manner described above with reference to FIG. 1. The pathway 130 further allows fluid to flow out through the orifice 135 when the pressure in the sensing pressure section 120 is greater than the pressure in the tank pressure section 125. The balancing springs 560, 570 minimize movement of the diaphragm assembly 115, thereby maintaining the diaphragm assembly 115 in a stable position. Accordingly, the detent rod 510 is maintained in the pressure relieve valve assembly 100 closed position, the detent ball 540 remains in retaining position, and the main poppet assembly 155 remains closed.

The pressure relief valve assembly 100 will remain in the closed position as long as the difference between the atmospheric pressure and the pressure in the tank remains between a predetermined threshold. In one known embodiment, the pressure relief valve assembly 100 will remain in the closed position as long as the difference between the atmospheric pressure and the pressure in the tank remains below 1.5 pounds per square inch differential (PSID) in a positive pressure relief condition and 0.8 PSID in a negative pressure relief condition. Such examples should not, however, be taken as limiting.

FIGS. 8A and 8B are a cross section of the pressure relief valve assembly 100, and a detailed cross section of the pilot valve assembly 140, in a positive tank pressure relief condition. In the positive pressure tank relief condition, the pressure in the tank pressure section 125 is greater than the atmospheric pressure by at least a predetermined threshold. When the predetermined threshold is reached, the positive tank pressure relief valve 210 will open as shown in Detail 8B, releasing fluid from the sensing pressure section 120 and thus reducing the pressure in the sensing pressure section 120.

This creates a pressure differential across the diaphragm assembly 115 which imparts a force on the diaphragm assembly 115 in the upward direction. Because the detent rod 510 is attached to the diaphragm assembly 115 it will also move upwards with diaphragm assembly 115. When the enlarged portion 520 of the detent rod 510 moves upward, the detent ball 540 will be pushed inward by the poppet guide 165 and deployment spring 170 until it clears the annular groove 550 in the poppet guide 165. When this happens, the deployment spring 170 will push the main poppet assembly 160 to its full open position where the poppet guide 165 stops against the inner primary housing 105. With the pressure relief valve assembly 100 now full open, the tank pressure will equalize with the atmospheric pressure.

FIGS. 9A and 9B are a cross section of the pressure relief valve assembly 100, and a detailed cross section of the pilot valve assembly 140, in a negative tank pressure relief condition. In the negative tank pressure relief condition, the atmospheric pressure is greater than the pressure in the tank pressure section 125 by at least a predetermined threshold. When the predetermined threshold is reached, the negative tank pressure relief valve 215 will open as shown in Detail C, and fluid will be forced into the sensing pressure section 120 and thus increasing the pressure in the sensing pressure section 120.

This creates a pressure differential across the diaphragm assembly 115 which imparts a force on the diaphragm assembly 115 in the downward direction. Because the detent rod 510 is attached to the diaphragm assembly 115 it will also move downwards with diaphragm assembly 115. When the enlarged section 520 of the detent rod 510 moves downward, the detent ball 540 will be pushed inward by the poppet guide 165 and deployment spring 170 until it clears the annular groove 550 in the poppet guide 165. When this happens, the deployment spring 170 will push the main poppet assembly 160 to its full open position where the poppet guide 165 stops against the inner primary housing 105. With the pressure relief valve assembly 100 now full open, the tank pressure will equalize with the atmospheric pressure.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A pressure relief valve assembly comprising:
   a housing;
   a diaphragm assembly separating the housing into a sensing pressure section and a tank pressure section, wherein the sensing pressure section is configured to sense both atmospheric pressure and tank pressure and the tank pressure section is configured to only sense tank pressure;

an orifice disposed between the sensing pressure section and the tank pressure section, allowing fluid to flow in through the orifice when the pressure in the sensing pressure section is less than the pressure in the tank pressure section, and to allow fluid to flow out through the orifice when the pressure in the sensing pressure section is greater than the pressure in the tank pressure section;

a pilot valve assembly disposed between the sensing pressure section and atmosphere, the pilot valve assembly being configured to open when a difference in pressure between the sensing pressure section and atmospheric pressure exceeds a predetermined first amount;

a main poppet assembly disposed in the tank pressure section, wherein the main poppet assembly is configured to open when a difference in pressure between the sensing pressure section and the tank pressure section meets a predetermined second amount.

2. The pressure relief valve assembly of claim 1, wherein the main poppet assembly includes a poppet guide and a deployment spring configured to force the main poppet assembly to an opened position.

3. The pressure relief valve assembly of claim 2, further comprising a locking member having a locked position in which the locking member engages the poppet guide, thereby maintaining the main poppet assembly in a closed position.

4. The pressure relief valve assembly of claim 3, further comprising a movable member connected to the diaphragm, the movable member having a closed pressure relief valve assembly position in which the movable member engages the locking member and biases the locking member towards the locked position, wherein the movable member is configured such that movement of the diaphragm assembly beyond a predetermined distance causes the movable member to move to an open pressure relief valve assembly position in which the movable member is disengaged with the locking member, allowing the locking member to move to an unlocked position.

5. The pressure relief valve assembly of claim 1, wherein the pilot valve assembly includes a positive tank pressure poppet and a negative tank pressure poppet.

6. A valve assembly comprising:
a main housing;
a diaphragm assembly including a diaphragm that separates the main housing into a sensing pressure section that is configured to sense an atmospheric pressure and a tank pressure through a pilot valve and orifice, respectively, and a tank pressure section that is configured to sense a tank pressure;
the pilot valve having one side sensing atmospheric pressure and the other side sensing pressure in the sensing pressure section of the main housing, the pilot valve comprising a positive tank pressure poppet configured to open when a difference in pressure between the sensing pressure section and an atmospheric pressure is greater than a predetermined threshold;
a detent member connected to the diaphragm;
a main poppet disposed in a main opening of the main housing and having a closed position;
a deployment spring that forces the main poppet to an opened position; and
a retaining member having a pressure relief valve assembly closed position in which the retaining member retains the main poppet in the closed position,
wherein the detent member has a closed position in which the detent member engages the retaining member and biases the retaining member towards the closed position,
wherein the opening of the pilot valve changes the pressure in the sensing pressure section and causes the diaphragm to move the detent member to the pressure relief valve assembly open position in which the detent member disengages the retaining member and allows the retaining member to move to the open position, thereby allowing the deployment spring to force the main poppet to the opened position.

7. The valve assembly of claim 6, further comprising a seal disposed about the main opening of the main housing.

8. The valve assembly of claim 6, further comprising a stop that prevents inward movement of the main poppet beyond a predetermined distance.

9. The valve assembly of claim 6, wherein the retaining member is a detent ball.

10. The valve assembly of claim 6, further comprising an orifice disposed between the sensing pressure section of the main housing and the tank pressure section.

11. The valve assembly of claim 6, wherein the pilot valve is configured to allow fluid to flow into the sensing pressure section of the main housing when the atmospheric pressure is greater than the pressure in the tank pressure section by the predetermined threshold, wherein the fluid flowing into the sensing pressure section of the main housing causes the diaphragm assembly to move downwards, wherein the diaphragm assembly moving downwards moves the detent member downwards to disengage the retaining member.

12. The valve assembly of claim 11, wherein the pilot valve is further configured to allow fluid to flow out of the sensing pressure section of the main housing when the atmospheric pressure is less than the pressure in the sensing pressure section by a predetermined threshold, wherein the fluid flowing out of the sensing pressure section of the main housing causes the diaphragm assembly to move upwards, wherein the diaphragm assembly moves upwards moving the detent member upwards to disengage the retaining member.

13. A pressure relief valve assembly comprising:
a main housing;
a diaphragm assembly including a diaphragm separating the main housing into a sensing pressure section and a tank pressure section;
an orifice disposed between the sensing pressure section and the tank pressure section, the orifice configured to allow fluid to flow in and out of the sensing pressure section to the tank pressure section;
a pilot valve assembly disposed between the sensing pressure section and atmosphere, the pilot valve assembly comprising a positive tank pressure poppet and a negative tank pressure poppet;
a main poppet;
a retaining member that retains the main poppet in a closed position;
a deployment spring that forces the main poppet to an opened position;
a detent member connected to the diaphragm assembly, wherein the detent member engages the retaining member.

14. The pressure relief valve of claim 13, further comprising at least one balancing spring adjacent the diaphragm assembly.

15. The pressure relief valve of claim 13, wherein the retaining member includes at least one detent ball.

16. The pressure relief valve of claim 13, wherein the retaining member is further configured to retain the main poppet in the opened position.

17. The pressure relief valve of claim 13, wherein the positive tank pressure poppet of the pilot valve is disposed inside the negative tank pressure poppet of the pilot valve.

* * * * *